United States Patent
Takaishi et al.

(10) Patent No.: US 9,466,328 B1
(45) Date of Patent: Oct. 11, 2016

(54) CONTACT-DETECTING METHOD, MANUFACTURING METHOD OF DISK DRIVE, AND DISK DRIVE

(71) Applicant: Kabushiki Kaisha Toshiba, Minato-ku, Tokyo (JP)

(72) Inventors: Kazuhiko Takaishi, Machida Tokyo (JP); Shinsuke Akiya, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/836,070

(22) Filed: Aug. 26, 2015

Related U.S. Application Data

(60) Provisional application No. 62/165,497, filed on May 22, 2015.

(51) Int. Cl.
*G11B 21/02* (2006.01)
*G11B 19/04* (2006.01)

(52) U.S. Cl.
CPC .................. *G11B 19/048* (2013.01)

(58) Field of Classification Search
CPC . G11B 20/10009; G11B 27/36; G11B 5/012; G11B 5/00; G11B 2220/90; G11B 5/6005; G11B 15/024; G11B 5/0086; G11B 5/02; G11B 5/54; G11B 5/5547

USPC .................. 360/75, 77.02, 78.04, 78.08, 48
See application file for complete search history.

(56) References Cited

U.S. PATENT DOCUMENTS

| | | | |
|---|---|---|---|
| 6,437,935 B1 * | 8/2002 | Johnson | G11B 5/5526 360/75 |
| 6,643,088 B1 | 11/2003 | Kawachi | |
| 7,215,498 B2 | 5/2007 | Calfee et al. | |
| 7,486,466 B2 | 2/2009 | Hara et al. | |
| 7,869,155 B1 | 1/2011 | Wong | |
| 8,315,005 B1 | 11/2012 | Zou et al. | |

* cited by examiner

*Primary Examiner* — Nabil Hindi
(74) *Attorney, Agent, or Firm* — White & Case LLP

(57) ABSTRACT

According to one embodiment, a contact-detecting method includes calculating a representative value for each of a plurality of first zones. The plurality of first zones is provided at different radial locations on the disk. The representative value is calculated based on values measured at a plurality of different radial locations included in each of the first zones. The method includes detecting a contact point at which a first member contacts with a second member based on a first difference. The first difference is a difference between a value measured at an objective measuring point and a representative value of a second zone among the plurality of first zones. The objective measuring point is included in a third zone among the plurality of first zones. The second zone is arranged radially inward of the third zone.

20 Claims, 12 Drawing Sheets

CONTACT-DETECTING METHOD, MANUFACTURING METHOD OF DISK DRIVE, AND DISK DRIVE

CROSS-REFERENCE TO RELATED APPLICATIONS

This application is based upon and claims the benefit of priority from U.S. Provisional Application No. 62/165,497, filed on May 22, 2015; the entire contents of which are incorporated herein by reference.

FIELD

Embodiments described herein relate generally to a contact-detecting method, a manufacturing method of disk drive, and a disk drive.

BACKGROUND

In some disk drives, a member (ramp member) having a ramp (slope) is provided in the proximity of the outer periphery of the disk to be used to retreat a head. To control the position of the head over the disk appropriately and within a wider range, a contact point at which a member proximal to the head contacts with the ramp member on the disk is desired to be detected. By detecting the contact point, preferable recording surface can be provided on the disk.

DETAILED DESCRIPTION

In general, according to one embodiment, there is provided a contact-detecting method. The method includes measuring a value corresponding to a force applied to an actuator at a plurality of measuring points disposed along a radial direction as the actuator moves a head along a substantially radial direction across a disk from an inner circumference to an outer circumference. The method includes calculating a representative value for each of a plurality of first zones. The plurality of first zones is provided at different radial locations on the disk each as a region having a predetermined width along the radial direction. The representative value is calculated based on values measured at a plurality of different radial locations included in each of the first zones. The method includes detecting a contact point at which a first member contacts with a second member based on a first difference. The first difference is a difference between a value measured at an objective measuring point and a representative value of a second zone among the plurality of first zones. The objective measuring point is included in a third zone among the plurality of first zones. The second zone is arranged radially inward of the third zone. The first member is attached proximal to the head. The second member is disposed in a proximity of an outer periphery of the disk.

Exemplary embodiments of a contact-detecting method will be explained below in detail with reference to the accompanying drawings. The present invention is not limited to the following embodiments.

First Embodiment

Figure 1:
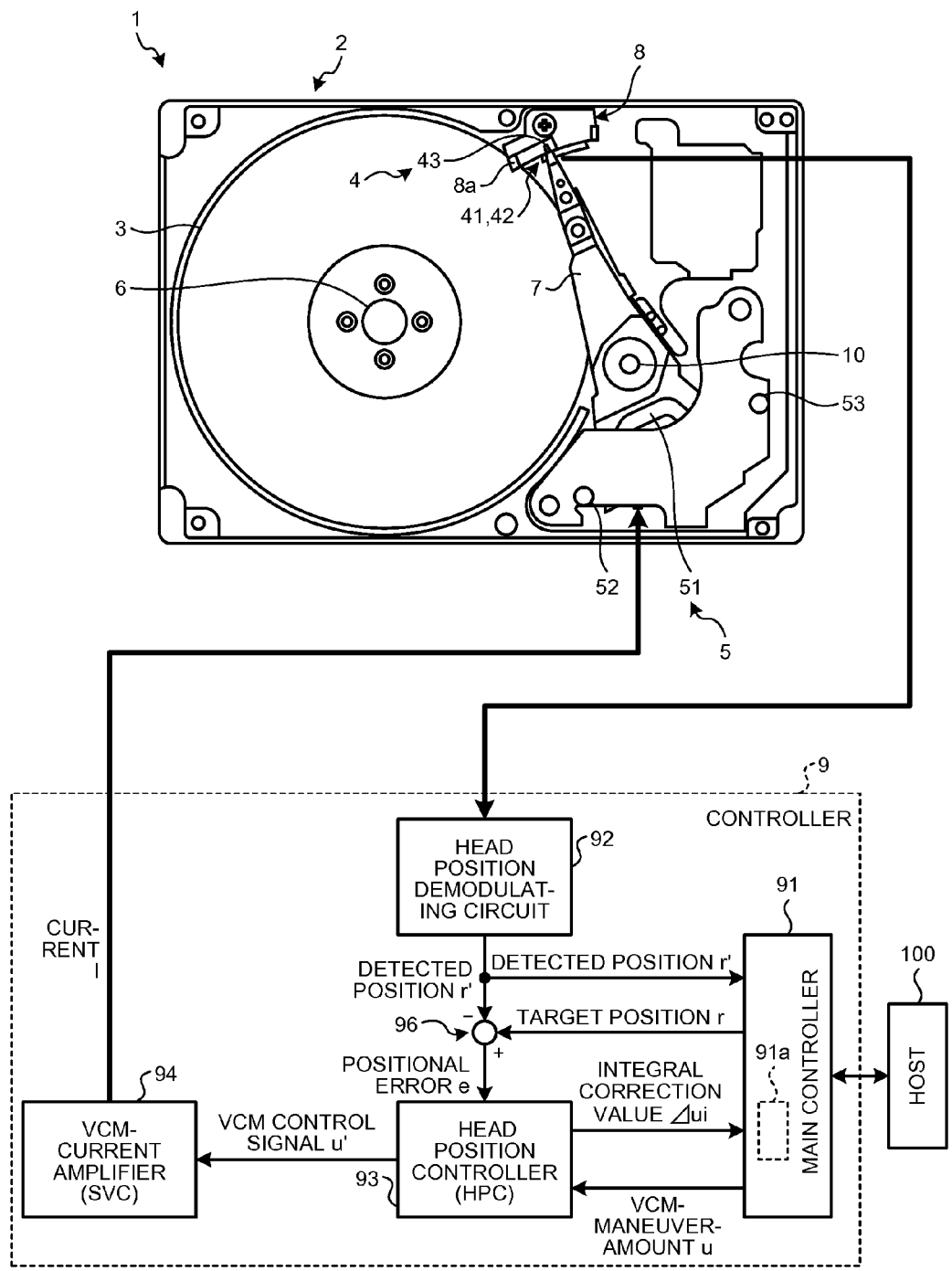
FIG. 1 illustrates a configuration of a disk drive according to a first embodiment.

A contact-detecting method according to a first embodiment is a method of detecting the positional relationship between a member proximal to a head of a disk drive and a ramp member, and is used in a manufacturing method of disk drive. In the manufacturing method of disk drive, for example, a point at which a member proximal to the head of a disk drive 1 as illustrated in FIG. 1 (load tab 43) makes contact with a ramp member 8 is detected (hereinafter the point is referred to as contact point). FIG. 1 is a plan view of a configuration of the disk drive 1.

For example, the disk drive 1 is used as an external storage device of a host 100 and configured to be connected to the host 100. The disk drive 1 includes a housing 2, a disk medium (hereinafter referred to as disk) 3, a head 4, the load tab (hereinafter referred to as tab) 43, an actuator 5, a spindle motor 6, an arm 7, the ramp member 8, and a controller 9.

One or more disk 3 is rotatably mounted on the housing 2 via the spindle motor 6. The disk 3 is a disk-shaped recording medium on which various types of information are recorded and is rotated by the spindle motor 6. For example, the disk 3 is a recording medium having a perpendicular magnetic recording layer. For example, a plurality of servo areas each radially extending from the center of the disk 3 is determined on the front and back surfaces of the disk 3. The servo areas are evenly provided along the circumferential direction. For example, servo information including a servo pattern and a sub-servo pattern is recorded in the servo area.

The head 4 and the arm 7 are mounted on the housing 2 to swing about the pivot 10. The head 4 is provided on a distal end of the arm 7, or a head supporting mechanism, to perform reading and writing of data on the disk 3. The head 4 is kept slightly above the surface of the disk 3 by a lift force produced by the rotation of the disk 3 to record or read information on the disk 3. The arm 7 swings about the pivot 10 to allow the head 4 to seek along the substantially radial direction of the disk 3, changing the location of reading and writing on the disk 3.

The head 4 reads servo information provided periodically on the disk 3 and outputs the read servo information (head signal) to the controller 9. Instructed by the servo information, the controller 9 controls the actuator 5 to perform positioning of the head 4 on the disk 3. The actuator 5 includes a voice coil motor (VCM) 51, the arm 7, and the head 4. The arm 7 is swung by the VCM 51 within a range restricted by an outer circumference stopper 52 and an inner circumference stopper 53. The VCM 51 includes a magnet and a voice coil. The magnet is attached to the housing 2. The actuator 5 instructs the head 4 to perform seek via the arm 7 corresponding to a current I supplied to the voice coil.

The controller 9 includes a main controller 91, a head position demodulating circuit 92, a subtractor 96, a head position controller (HPC) 93, and a VCM-current amplifier (SVC) 94. The head position demodulating circuit 92 demodulates the head signal into a head position signal (detected position) r' representing the radial location of the head 4 on the disk 3 and supplies the head position signal to the subtractor 96 and the main controller 91. The subtractor 96 receives a target position signal (target position) r from the main controller 91, subtracts the head position signal r' from the target position signal r, and supplies the result of subtraction to the head position controller 93 as a positional error e. The head position controller 93 calculates a correction amount $\Delta u$ for correcting a VCM-maneuver-amount u of the actuator 5 so as to reduce the positional error e to zero. For example, the head position controller 93 calculates a proportional correction value $\Delta up$, an integral correction value $\Delta ui$, and a differential correction value $\Delta ud$ based on the positional error e through PID control, and then sums them up to calculate the correction amount $\Delta u$ ($=\Delta up+\Delta ui+\Delta ud$). The head position controller 93 supplies a VCM control signal u', which is the sum of the VCM-maneuver-amount u and the correction amount $\Delta u$, to the SVC 94. Instructed by the VCM control signal u', the SVC 94 generates a current I (or voltage V) used for seek performed by the head 4 and supplies the current I (or voltage V) to the VCM 51.

Figure 5:
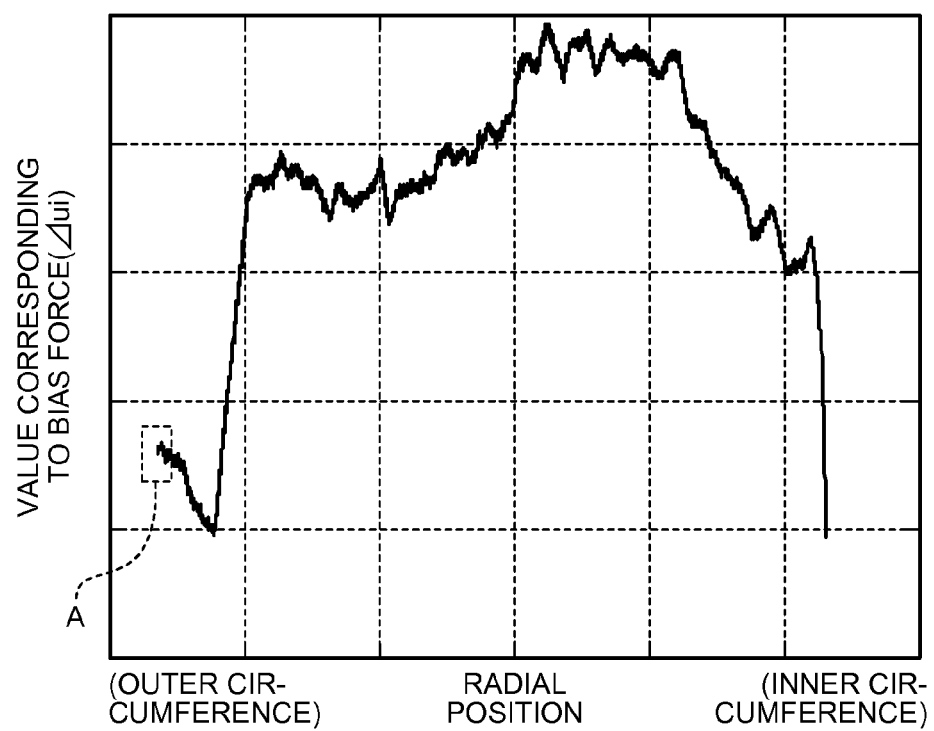
FIG. 5 is a chart illustrating an example measured result of a value corresponding to a bias force in the first embodiment.

The main controller 91 includes a measuring circuit 91a. The measuring circuit 91a receives the detected position r' from the head position demodulating circuit 92 and the integral correction value $\Delta ui$ from the head position controller 93. The measuring circuit 91a calculates the integral correction value $\Delta ui$ at a measuring point which is a detected position r' disposed along the radial direction by a predetermined step width. The measuring circuit 91a plots the integral correction values $\Delta ui$ at each measuring point to obtain a measured result as illustrated in FIG. 5, for example. FIG. 5 is a chart illustrating an example measured result of values (integral correction value $\Delta ui$) corresponding to a force acting on the actuator 5 obtained by such a manner. FIG. 5 will later be described in detail.

The head 4 includes a write head 41 and a read head 42. The tab 43 is a member attached proximal to the head 4, for example, on the distal end of the arm 7. The tab 43 moves along the radial direction of the disk 3 as the actuator 5 swings. A ramp member 8 is disposed on the traveling path of the tab 43 in the proximity of the outer periphery of the disk 3. The ramp member 8 is secured on the housing 2. The tab 43 is received by the ramp member 8.

The ramp member 8 has a ramp (slope) 8a extending along the traveling path of the tab 43. The distance between the surface of the ramp 8a and the imaginary plane including the surface 3a of the disk 3 gradually increases toward the direction remote from the rotational axis of the disk 3. As the head 4 seeks toward the direction remote from the center (rotational axis) of the disk 3, the member proximal to the head 4 (tab 43) makes contact with the ramp member 8, and then the tab 43 climbs up along the ramp 8a. In this manner, the head 4 retreats (is unloaded) from the proximity of the surface 3a of the disk 3 onto the ramp member 8. In contrast, as the head 4 seeks toward the center (rotational axis) of the disk 3, the tab 43 slides down along the ramp 8a. In this manner, the head 4 is guided (unloaded) from the ramp member 8 onto the proximity of the surface 3a of the disk 3. The ramp member 8 and the tab 43 together constitute and function as a loading/unloading mechanism.

In the manufacturing method of the disk drive 1, a servo pattern is written on the disk 3.

Figure 2:
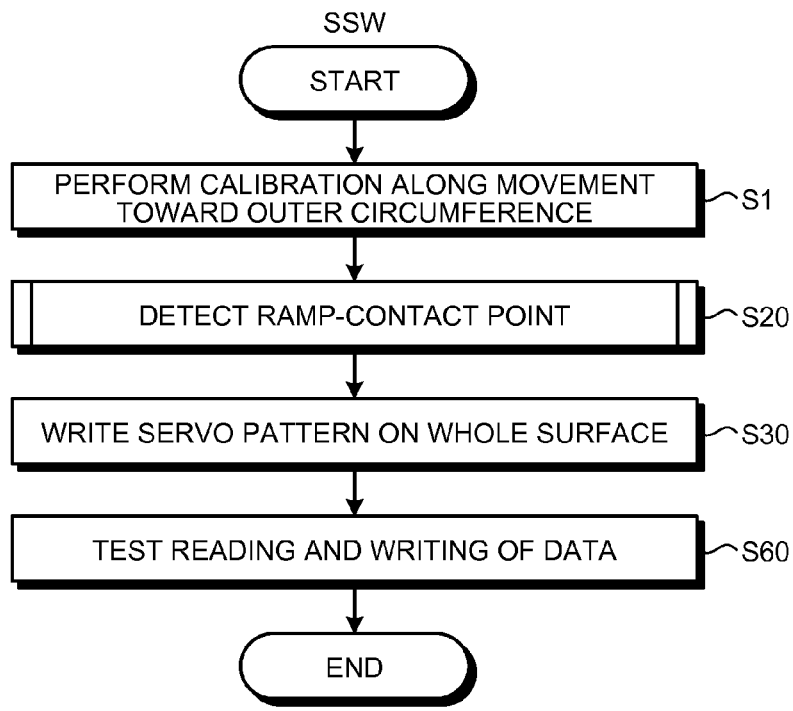
FIG. 2 is a flow chart of an example manufacturing method of a disk drive using a contact-detecting method according to the first embodiment.

For example, in the self servo write (SSW) technique as illustrated in FIG. 2, a plurality of disks 3 each having thereon a sub-servo pattern written by the servo track writer (STW) is mounted on the housing 2. The controller 9 moves the head 4 from the inner circumference to the outer circumference to perform various calibrations by positioning control or the like using the sub-servo pattern (S1). The controller 9 then performs the contact-detecting method according to the embodiment. For example, the controller 9 performs positioning control of the head 4 using the sub-servo pattern and detects the contact point (S20). The controller 9 uses the sub-servo pattern to move the head 4, by a predetermined track pitch, from the inner circumference to the contact point detected in S20 and simultaneously writes the servo patterns on a plurality of disks 3 (S30). In this manner, a plurality of concentric circular tracks is determined on each disk 3. The controller 9 writes data in each track along with the positioning control performed with reference to the center of each track using the servo pattern. The controller 9 checks whether the written data can properly be read. In other words, the controller 9 tests the reading and writing of data (S60). FIG. 2 is a flow chart illustrating a manufacturing method of disk drive in accordance with the SSW technique, which is an example manufacturing method of disk drive using the contact-detecting method (S20).

Figure 3:
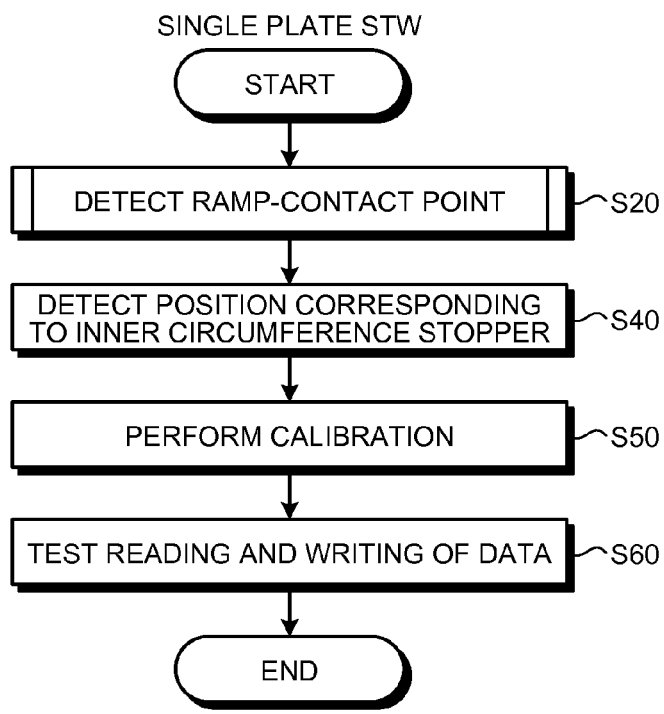
FIG. 3 is a flow chart of another example manufacturing method of the disk drive using the contact-detecting method according to the first embodiment.

Alternatively, for example, in the single platter servo track writer (STW) technique as illustrated in FIG. 3, a servo pattern is written on the single platter of (one) disk 3 by the STW. A plurality of disks 3 having the servo pattern written thereon is mounted on the housing 2. The controller 9 then performs the contact-detecting method according to the embodiment. For example, the controller 9 performs positioning control of the head 4 using the servo pattern and detects the contact point (S20). The controller 9 moves the head 4 from the outer circumference to the inner circumference and detects, using the servo pattern, the circumferentially inner most position as the position of the head 4 corresponding to the inner circumference stopper 53 (S40). The controller 9 calibrates, using the servo pattern, the controlled position of the head 4 based on the contact point detected in S20 and the position detected in S40 (S50). In this manner, a plurality of tracks accessible by the head 4 is determined on each disk 3. The controller 9 writes data in each track along with the positioning control performed with reference to the center of each track using the servo pattern. The controller 9 checks whether the written data can properly be read. In other words, the controller 9 tests the reading and writing of data (S60). FIG. 3 is a flow chart illustrating a manufacturing method of disk drive in accordance with the single platter STW technique, which is another example manufacturing method of disk drive using a contact-detecting method (S20).

To increase the recording capacity on the disk 3 of the disk drive 1, the recording area on the disk 3 should be increased. To effectively increase the recording area on the disk 3, the moving range of the head 4 (movable range from the position corresponding to the inner circumference stopper 53 to the position at which the head 4 makes contact with the ramp member 8, which is hereinafter referred to as stroke) needs to be recognized correctly.

Because of tolerances in dimension and assembly of mechanical parts of each disk drive 1, there is variation in the stroke of the head 4. If the stroke of the head 4 for each disk drive 1 can be measured, a proper (maximum, for example) stroke of the head 4 can be provided for each disk drive 1. The position corresponding to the inner circumference stopper 53 is relatively easy to control because the movement of the head 4 is physically restricted at the position. In contrast, at the contact point, the movement of the head 4, even when making contact with the ramp member 8, is not restricted. Therefore a technique is necessary to detect the contact point.

A method directly using the head position signal (detected position) r', for example, detecting the position as the contact point when the amplitude of the head position signal r' decreases to be smaller than a predetermined threshold (or when the amplitude decreases to be so small that the positioning control can no longer be performed) may be used (first method). The disk drive 1 usually has a plurality of heads 4. In the first method, detection is made only for the head 4 which is to be demodulated. So that if the member proximal to the head 4 (tab 43) other than that of the head 4 to be demodulated makes contact with the ramp member 8, the detection of the contact point is difficult. Moreover, in the first method, the member may travel a long distance after making contact with the ramp member 8 until demodulation fails, so that the accuracy of detecting the contact point is likely to be low.

Alternatively, for example, another method in which the head 4 is controlled to move at a constant velocity until the member proximal to the head 4 (tab 43) makes contact with the ramp member 8 where velocity changes, and the distance between the location where the constant-velocity control starts and the location where the velocity changes is measured using the time when the change in velocity has been detected by the counter-electromotive voltage in the VCM 51 (second method) may be used. The measurement accuracy of the second method however is susceptible to an error of the velocity from the target velocity, which may result in low accuracy of detecting the contact point. Moreover, the second method is likely to have larger measurement error at higher velocity, which may result in low accuracy of detecting a contact point.

Figure 4A:
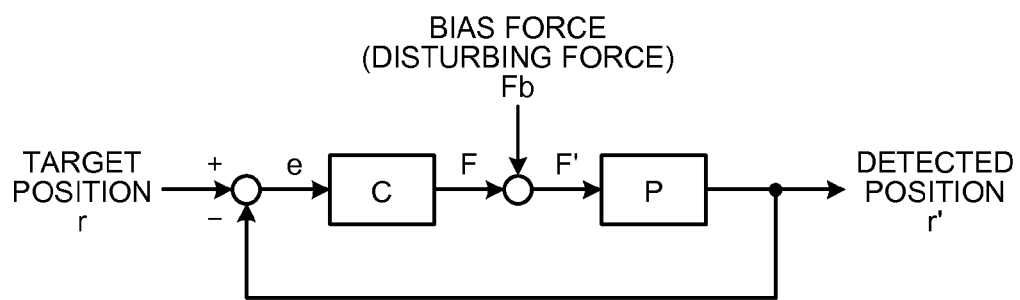
FIG. 4A is a block diagram illustrating a configuration of feedback control used in the first embodiment.

Therefore, a detecting method of a contact point having higher accuracy of detection than the first method and the second method is desired. When the controller 9 performs feedback control of the position of the head 4, for example, a disturbing force (bias force) Fb, such as a wind force, or force from FPC (flexible printed circuit), interferes with the force applied by the actuator 5, thereby changing the force acting on the head 4 as illustrated in FIG. 4A. and FIG. 4A is a block diagram illustrating a configuration of feedback control used in the disk drive 1. The plant P represents a model having transfer characteristic of a sequential path through the arm 7, the head 4, and the head position demodulating circuit 92. The controller C represents a model having transfer characteristic of a sequential path through the head position controller 93, the VCM-current amplifier (SVC) 94, and the VCM 51 (actuator 5). The controller 9 performs positioning control of the head 4 with correction to cancel the effect of the bias force Fb using a value corresponding to the bias force Fb. The value for the correction is used as a value corresponding to the bias force Fb. Along with the head 4 moving by a predetermined step from the inner circumference to the outer circumference along a substantially radial direction, the value corresponding to the bias force Fb may be measured and used for detecting the contact point.

For example, the force applied to the head 4 by the ramp member 8 when the member proximal to the head 4 (tab 43) contacts the ramp member 8 may be larger than a disturbing force, such as a wind force. Regarding such case, a method in which an origin of measurement for measuring a reference value is fixed and the point at which the change in the value corresponding to the bias force Fb from the value measured at the origin of measurement exceeds a threshold is determined as the contact point (third method) may be used. In the third method, however, since the origin of measurement is fixed, the control of following the change in the value corresponding to the bias force Fb may fail as the distance between the origin of measurement and the point of contact with the ramp increases. This may result in a large detection error.

In another case, the chronological change in the force applied to the head 4 when the member proximal to the head 4 (tab 43) is making contact with the ramp member 8 may be larger than the chronological change of a disturbing force, such as a wind force. Regarding such a case, a method in which the measuring point measured just before is used as the origin of measurement for each measuring point and a point at which the change in value corresponding to the bias force Fb from the value measured at the measuring point measured just before exceeds a threshold is determined as the contact point (fourth method) may be used.

In either of the third method and the fourth method, when there is variation in measured values, a point located in circumferentially inner side of the actual contact point may be detected as the contact point. This may result in low accuracy of detecting the contact point.

Furthermore, in either of the third method and the fourth method, the fluctuating trend of the value corresponding to the bias force Fb is assumed to be a monotonic increase from the inner circumference to the outer circumference. So that when the fluctuating trend of the value corresponding to the bias force Fb is not a monotonic increase, detection of a contact point is difficult.

Figure 4B:
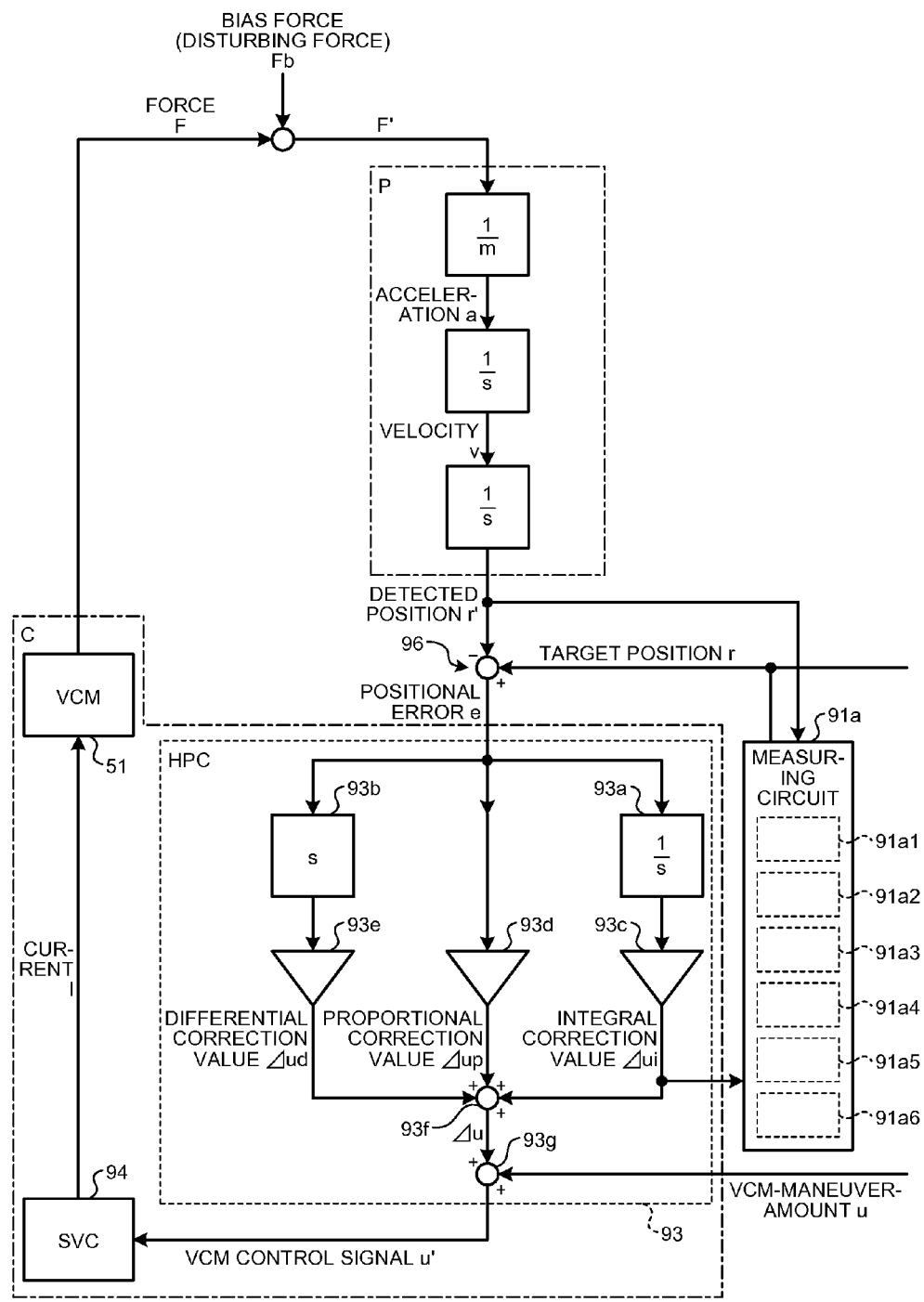
FIG. 4B is a block diagram illustrating a configuration of a head position controller and a measuring circuit according to the first embodiment.

For example, as illustrated in FIG. 4B, the integral correction value $\Delta ui$ produced in the head position controller 93 can be used as the value corresponding to the bias force Fb. FIG. 4B is a block diagram illustrating the configuration of the head position controller 93 and the measuring circuit 91a.

The head position controller 93 includes an integrator 93a, a differentiator 93b, amplifiers 93c to 93e, and adders 93f and 93g. The integrator 93a integrates positional errors e received from the subtractor 96 and supplies the integrated result to the amplifier 93c. The amplifier 93c amplifies the integrated result produced in the integrator 93a to produce the integral correction value $\Delta ui$ and supplies the integral correction value $\Delta ui$ to the adder 93f. The amplifier 93d amplifies the positional error e received from the subtractor 96 to produce the proportional correction value $\Delta up$ and supplies the proportional correction value $\Delta up$ to the adder 93f. The differentiator 93b differentiates the positional error e received from the subtractor 96 and supplies the differentiated result to the amplifier 93e. The amplifier 93e amplifies the differentiated result produced in the differentiator 93b to produce the differential correction value Δud and supplies the differential correction value Δud to the adder 93f.

The adder 93f adds up the proportional correction value Δup, the integral correction value Δui, and the differential correction value Δud into the correction value Δu and supplies the correction value Δu to the adder 93g to be used in PID control. The adder 93g receives the VCM-maneuver-amount u from the main controller 91 (see FIG. 1) and the correction value Δu for PID control from the adder 93f. The adder 93g adds the correction value Δu to the VCM-maneuver-amount u to calculate the VCM control signal u' and supplies the VCM control signal u' to the SVC 94.

As illustrated in FIG. 5, the measured result obtained by the measuring circuit 91a shows that, along with the head 4 moving from the inner circumference to the outer circumference, the measured value gradually increases, then fluctuates, and finally steeply drops near the outer circumference. The measured result illustrated in FIG. 5 shows that the fluctuating trend of the value corresponding to the bias force Fb is not a monotonic increase or a monotonic decrease. The area A contoured with a dashed line in FIG. 5 indicates the region proximal to the contact point. As in the third method, if a point is detected as the contact point when the value corresponding to the bias force Fb exceeds the threshold, the point located circumferentially inward of the region A may be detected as the contact point.

Figure 6:
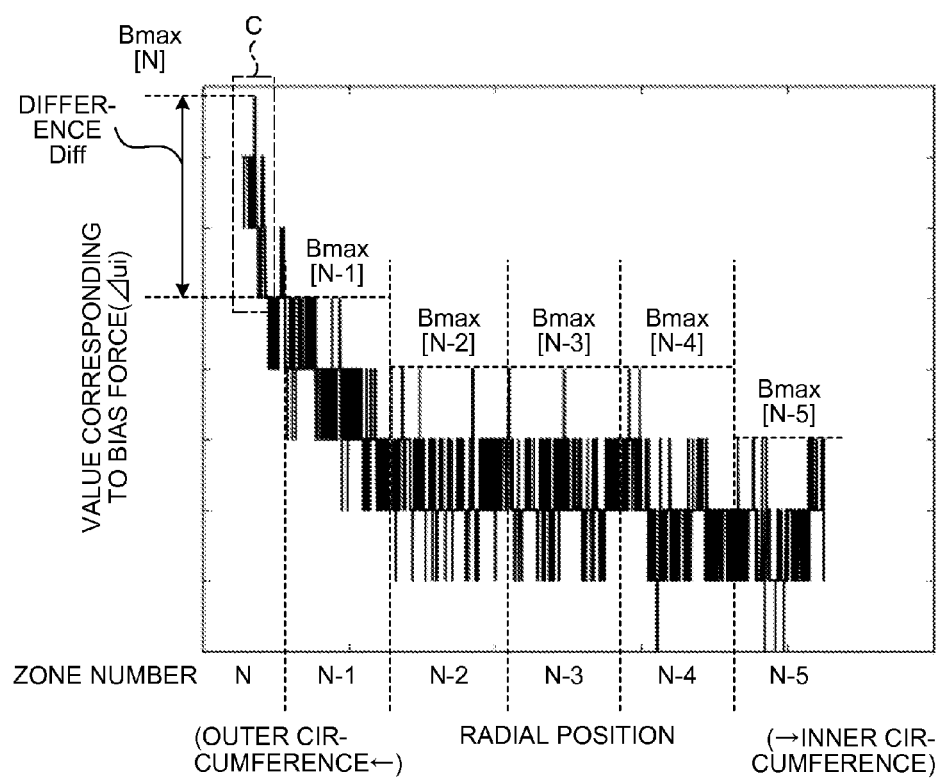
FIG. 6 illustrates a contact-detecting method according to the first embodiment.

FIG. 6 shows the enlarged region A, enlarged along the vertical axis and the horizontal axis. The measured result illustrated in FIG. 6 shows that the measured value varies among measuring points. The area C contoured with a dashed-dotted line in FIG. 6 indicates the region proximal to the contact point. As in the fourth method, if a point is detected as the contact point when a difference in the value corresponding to the bias force Fb between the measuring point and the measuring point measured just before exceeds the threshold at each measurement point, the point located circumferentially inward of the region C may be detected as the contact point.

In this way, in order to detect the contact point with high accuracy, a new contact-detecting method is desired that meets the requirements of: (1) being not susceptible to the effect of variation among measured values; (2) using an unfixed, or changing, origin of measurement to reduce the distance between the present measuring point and the origin; (3) being effective also when the trend of the measured value toward the point where the contact with the ramp is made is not a monotonic increase; and (4) being effective whether the trend of the measured value after the contact with the ramp is steep or moderate.

Accordingly, the embodiment includes steps of determining a plurality of zones divided along the radial direction on the disk 3 with each zone including a plurality of measuring points, calculating a representative value of the measured value for each zone, and detecting the contact point based on the difference between the present measured value and the representative value of the zone measured just before. The contact-detecting method that satisfies the four requirements (1) to (4) can thus be provided.

Specifically, the origin of measurement is unfixed, that is, changeable. For example, the recording area on the disk 3 is divided in a plurality of concentric annular zones each of which including a plurality of measuring points disposed along the radial direction. The disk drive 1 moves the head 4 from the inner circumference to the outer circumference along the substantially radial direction to measure the value corresponding to the bias force Fb (e.g., an integral correction value Δui) at each of a plurality of measuring points disposed along the radial direction. The disk drive 1 then compares the measured value of the present measuring point and the representative value of the zone measured just before. In this manner, the origin can easily follow the change in the measured value, and thus the disk drive 1 can operate effectively under the fluctuating trend from the inner circumference to the outer circumference which is not a monotonic increase.

For example, the maximum value among a plurality of measured values in the zone may be determined as the representative value of the zone. This moderates the effect of measurement variation among measured values. When the tab 43 contacts the ramp member 8, the bias force increases. Even with measurement variation among measured values, the disk drive 1 can recognize the contact of the tab 43 with the ramp member 8 by tracking the maximum value. For example, the disk drive 1 measures the present measured value to update the maximum bias value in the present zone. The maximum bias value is used in measurement in the next zone.

The disk drive 1 calculates the difference between the present measured value of the present zone and the representative value (e.g., a maximum value) of the zone measured just before. In other words, the representative value (e.g., a maximum value) is calculated to represent a plurality of measured values in the zone measured just before, and the representative value is used as the measured value at the origin of measurement. Thus by using a different origin of measurement for each zone, the effect of variation among measured values can be moderated in each zone.

When the difference is larger than a predetermined decision-value (designated slice), it can be determined that the member proximal to the head 4 (tab 43) has made contact with the ramp member 8.

In this method, the zone width needs to be appropriately determined. If the zone width is too small, the method is susceptible to the effect of measurement error and fluctuation of measured values. If the zone width is too large, the long distance from the origin may cause failure in following the change in the measured value. For example, a 2.5-type disk drive, of which measured result is shown (see FIGS. 5 and 6), may have a zone width of approximately 6 micrometers including 200 steps (200 measuring points).

More specifically, the measuring circuit 91a includes a determination circuit 91a1, a measurement processing circuit 91a2, a calculation circuit 91a3, an operation circuit 91a4, a decision circuit 91a5, and a storage circuit 91a6, as illustrated in FIG. 4B.

The determination circuit 91a1 divides the area into zones by a designated step width. That is, the determination circuit 91a1 determines a plurality of zones on the disk 3. A plurality of zones is concentrically determined on the disk 3. Each zone includes a plurality of measuring points disposed along the radial direction.

For example, as illustrated in FIG. 6, the determination circuit 91a1 determines a plurality of zones denoted with zone numbers of, from the inner circumference to the outer circumference, N-5, N-4, N-3, N-2, N-1, and N. FIG. 6 illustrates the contact-detecting method. A plurality of annular zones, N-5 to N, is concentrically determined on the disk 3. As illustrated in FIG. 6, each of zones N-5 to N includes a plurality of measuring points disposed along the radial direction. The number of measuring points disposed along the radial direction to be included in each of zones N-5 to N is previously determined by experiment so that the effect of variation among measured values at each measuring point on the accuracy of detection is within an allowable range.

Referring back to FIG. 4B, the measurement processing circuit 91a2 moves the head 4 along a substantially radial direction to measure a value corresponding to the bias force Fb at different measuring points. For example, the measurement processing circuit 91a2 changes the target position r by a designated step width to move the head 4 along the substantially radial direction to position the head 4 at a different measuring point. In parallel, the measurement processing circuit 91a2 associates each measured value (integral correction value Δui) with the measuring point disposed along the radial direction and with an identifier (e.g., a zone number) of the zone including the measuring point. The measurement processing circuit 91a2 averages values measured at a plurality of measuring points circumferentially disposed on the same radial location for one circuit to determine the measured value of the measuring points on the radial location. In this manner, the effect of eccentricity, repeatable runout (RRO), and non-repeatable runout (NRRO) of the disk 3 on the measured value can be reduced. The measurement processing circuit 91a2 can thus obtain the measured result as illustrated in FIGS. 5 and 6.

The calculation circuit 91a3 calculates the representative value of measured values of zones N-5 to N. For example, as illustrated in FIG. 6, the calculation circuit 91a3 determines maximum values Bmax[N-5], Bmax[N-4], Bmax[N-3], Bmax[N-2], Bmax[N-1], and Bmax[N] for zones N-5, N-4, N-3, N-2, N-1, and N, respectively. The calculation circuit 91a3 may calculate the representative value of measured values of the zones N-5 to N at a timing when the measurements at a plurality of measuring points disposed along the radial direction and included in the zone is completed for each of zones N-5 to N. Alternatively, the calculation circuit 91a3 may sequentially repeat calculation and updating of the representative value of measured values until the measurements in the zone is completed for each of zones N-5 to N. In this manner the calculation circuit 91a3 can calculate the representative value of values measured at a plurality of measuring points in each zone.

The operation circuit 91a4 receives the value measured at the present measuring point from the measurement processing circuit 91a2 and the representative value (e.g., a maximum value Bmax) of the zone measured just before the zone including the present measuring point from the calculation circuit 91a3. The operation circuit 91a4 calculates Diff, which is the difference between the value measured at the present measuring point and the representative value of the zone measured just before. For example, the operation circuit 91a4 subtracts the maximum value Bmax of the zone measured just before from the value measured at the present measuring point to calculate the difference Diff. As illustrated in FIG. 6, when the zone including the present measuring point is zone N, the operation circuit 91a4 subtracts the maximum value Bmax[N-1] of the zone N-1 measured just before from the value measured at the present measuring point to calculate the difference Diff.

The decision circuit 91a5 receives the difference Diff from the operation circuit 91a4. The decision circuit 91a5 decides whether the head 4 has made contact with the ramp member 8 based on the difference Diff. For example, the decision circuit 91a5 decides whether the difference Diff satisfies a first determination condition. The first determination condition includes the condition of difference Diff exceeding a decision-value DiffSlice. If the first determination condition is satisfied, the decision circuit 91a5 decides that the present measuring point is the contact point. In other words, if the difference Diff is below or equal to the decision-value DiffSlice, the decision circuit 91a5 decides that the present measuring point is not the contact point. If the difference Diff exceeds the decision-value DiffSlice, the decision circuit 91a5 decides that the present measuring point is the contact point.

On receiving the result of the decision made by the decision circuit 91a5, the storage circuit 91a6 stores the received information as the contact point information. Referring to the storage circuit 91a6, the controller 9 can recognize the contact point. The stroke of the head 4 can thus be recognized correctly during the process of manufacturing the disk drive 1. For example, by using the self servo write (SSW) technique, the servo pattern can be written on the disk 3 also in an area proximal to the ramp member 8. Alternatively, by using the single platter STW technique for example, a positioning parameter of the head 4 can be calibrated so that the positioning control of the head 4 can be performed even in an area proximal to the ramp member 8. As a result, for example, the recording area can be provided on the disk 3 also in the area proximal to the ramp member 8.

Figure 7:
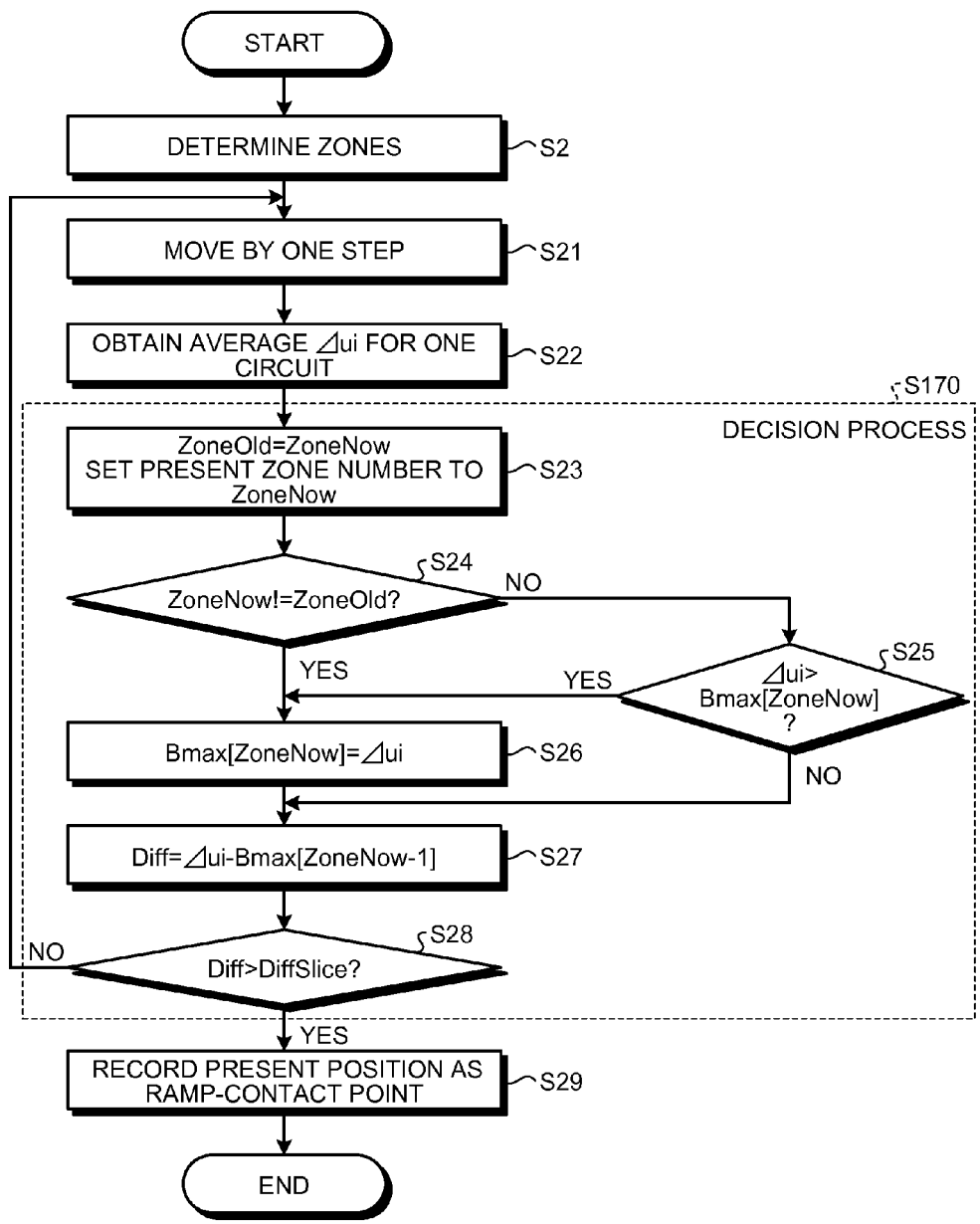
FIG. 7 is a flow chart illustrating a contact-detecting method according to the first embodiment.

The contact-detecting method (S20 in FIGS. 2 and 3) will now be described referring to FIG. 7. FIG. 7 is a flow chart illustrating the contact-detecting method.

The controller 9 determines a plurality of zones each including a plurality of measuring points disposed along the radial direction on the disk 3 (S2). The controller 9 determines a zone number for each zone so that the zone numbers increases toward the moving direction of the head 4 (from the inner circumference to the outer circumference) (see FIG. 6). For example, a plurality of zones N-5 to N illustrated in FIG. 6 is concentrically determined on the disk 3. Each of the zones N-5 to N includes a plurality of measuring points disposed along the radial direction.

The controller 9 moves the head 4 radially outward by a step to position the head 4 at a measuring point where measuring is to be performed in the radial direction (S21). The controller 9 averages values (integral correction values Δui) measured at a plurality of measuring points disposed on the same radial location for one circuit and determines the calculated value as the measured value of the measuring point (S22). The controller 9 then performs the decision process to decide whether the member proximal to the head 4 (tab 43) has made contact with the ramp member 8 (S170).

In the decision process (S170), the controller 9 determines the value (zone number) of a parameter "ZoneNow" as the value of a parameter "ZoneOld", and determines the zone number of the present zone as the value of the parameter "ZoneNow" (S23). The controller 9 compares the value of the parameter "ZoneNow" with the value of the parameter "ZoneOld" (S24).

If the value of the parameter "ZoneNow" and the value of the parameter "ZoneOld" are not identical (Yes in S24), the controller 9 decides that the zone including the present measuring point is not the zone including the measuring point measured just before, that is, the controller 9 decides a different zone is being measured. Responding to this change in zones, the controller 9 determines the present measured value Δui as the representative value Bmax"ZoneNow" of the present zone (S26).

If the value of the parameter "ZoneNow" and the value of the parameter "ZoneOld" are identical (No in S24), the controller 9 decides that the zone including the present measuring point and the zone including the measuring point measured just before are identical. In this state, the representative value of the present zone may have a chance to be updated, so the controller 9 decides whether the present measured value Δui exceeds the representative value Bmax"ZoneNow" of the present zone (S25).

If the present measured value Δui exceeds the representative value Bmax"ZoneNow" of the present zone (Yes in S25), the controller 9 determines that the representative value of the present zone should be updated and determines the present measured value Δui as the representative value Bmax"ZoneNow" of the present zone (S26).

If the present measured value Δui does not exceed the representative value Bmax"ZoneNow" of the present zone (No in S25), the controller 9 decides that the representative value of the present zone need not be updated and advances the process to S27.

Then the controller 9 calculates the difference Diff between the present measured value Δui and the representative value Bmax"ZoneNow-1" of the zone measured just before. For example, the controller 9 calculates the difference Diff by subtracting the representative value Bmax"ZoneNow-1" of the zone measured just before from the present measured value Δui (S27).

The controller 9 decides whether the difference Diff exceeds the decision-value DiffSlice (S28). If the difference Diff does not exceed the decision-value DiffSlice (No in S28), the controller 9 decides that the member proximal to the head 4 (tab 43) has not yet made contact with the ramp member 8 and returns the process to S21.

If the difference Diff exceeds the decision-value DiffSlice (Yes in S28), that is, if the determination condition in the decision process (S170) is satisfied, the controller 9 decides (detects) that the present measuring point is the contact point. The controller 9 then records the present measuring point as the contact point, for example, in the storage circuit 91a6 (S29).

As described above, in the contact-detecting method according to the first embodiment, a plurality of zones each including a plurality of measuring points disposed along the radial direction is determined on the disk 3 and the head 4 is moved along the substantially radial direction from the inner circumference to the outer circumference to measure the value corresponding to the bias force Fb at different measuring points. Then the representative value of measured values is calculated for each zone. Based on the calculated difference between the present measured value and the representative value of the zone measured just before, the contact point is detected. For example, if the difference exceeds the decision-value DiffSlice, the present measuring point is detected as the contact point. In this manner, the effect of variation among measured values on the representative value of each zone is moderated. By using such representative values, variation among measured values has moderate effect on the obtained difference. Thus the contact point is detected by the change in the difference, which receives moderated effect from variations among measured values, and the accuracy of detecting the contact point can be improved even when variation among measured values exists.

In the first embodiment, based on the calculated difference between the present measured value and the representative value of the zone measured just before, the contact point is detected. That is, the zone measured just before can be used as the origin of measurement for the present measuring point. By changing the origin of measurement instead of fixing, the distance between the present measuring point and the origin can be reduced. In this manner, the accuracy of detecting the contact point can easily be improved.

In the first embodiment, based on the calculated difference between the present measured value and the representative value of the zone measured just before, the contact point is detected. By detecting the relative change between the present measured value and the representative value of the zone measured just before, the contact point can be detected even when the trend of the change in measured values is not a monotonic increase.

In the first embodiment, the relative change between the present measured value and the representative value of the zone measured just before is detected, so that the method is effective whether the change in the measured value (gradient of fluctuating trend) after the head 4 making contact with the ramp member 8 is steep or gradual.

It should be noted that, although the first embodiment exemplifies a case where the representative value of the zone is the maximum of the value corresponding to the bias force in the zone, the representative value of the zone is not limited to a maximum value as long as the representative value represents the value of the zone. For example, the representative value of the zone may be the average of values measured at a plurality of measuring points included in the zone. In this case, the decision-value DiffSlice may be adjusted larger than the decision-value DiffSlice used when the maximum value is the representative value of the zone.

Alternatively, the positioning control system to carry out the embodiment is not limited to the control system illustrated in FIG. 1. For example, a control system corresponding to a unit including the VCM 51 as a mechanism for driving the actuator 5, or a control system corresponding to a dual stage actuator (DSA), that is, a unit including a mechanism providing fine motion drive by using PZT element attached to a distal end of each arm of the actuator 5 including the VCM 51 on its root or attached to a suspension, may be used. In any of those control systems, the correction value (integral correction value Δui) used in the control system (positioning control system) of the VCM 51 to correct the effect of the bias force before and after the contact made between the member proximal to the head 4 (tab 43) and the ramp member 8 steeply changes. The control system (positioning control system) of the VCM 51 may be an observer control system using a bias estimation function or a control system using a PI regulator and a lead-lag filter. Any control system equivalently including an integrator element and configured to have infinite DC component in a compensator of the control system of the VCM 51 may be adapted.

Alternatively, the value to be measured, or the value corresponding to the bias force, is desirably a correction value (integral correction value Δui) for correcting the effect of the bias force in the control system of the VCM 51, although the value to be measured may be a VCM-control current I which is a final output. For any value to be measured, the value is preferably measured at a plurality of measuring points in each radial direction for one or more cycles and averaged, so as to reduce the effect of eccentricity, RRO, and NRRO.

Second Embodiment

A contact-detecting method according to a second embodiment will now be described. Description will mainly be made for the configuration different from the first embodiment, and description on the same component as the first embodiment will be omitted or simplified.

In the first embodiment, decision is made whether the difference Diff between the present measured value and the representative value of the zone measured just before exceeds the decision-value (designated slice) DiffSlice. In this manner, the accuracy of detecting the contact point can be improved.

Although the method is required to be effective under variation of measured values corresponding to the bias force Fb by setting the decision-value (designated slice) DiffSlice as small as possible to reduce an error in detecting the contact with the ramp.

In the second embodiment, detection is made when the difference Diff consecutively exceeds the decision-value (designated slice) DiffSlice a threshold times (predetermined times) instead of just exceeding once. The number of times of exceeding is reset when measurement starts in the next zone.

Figure 8:
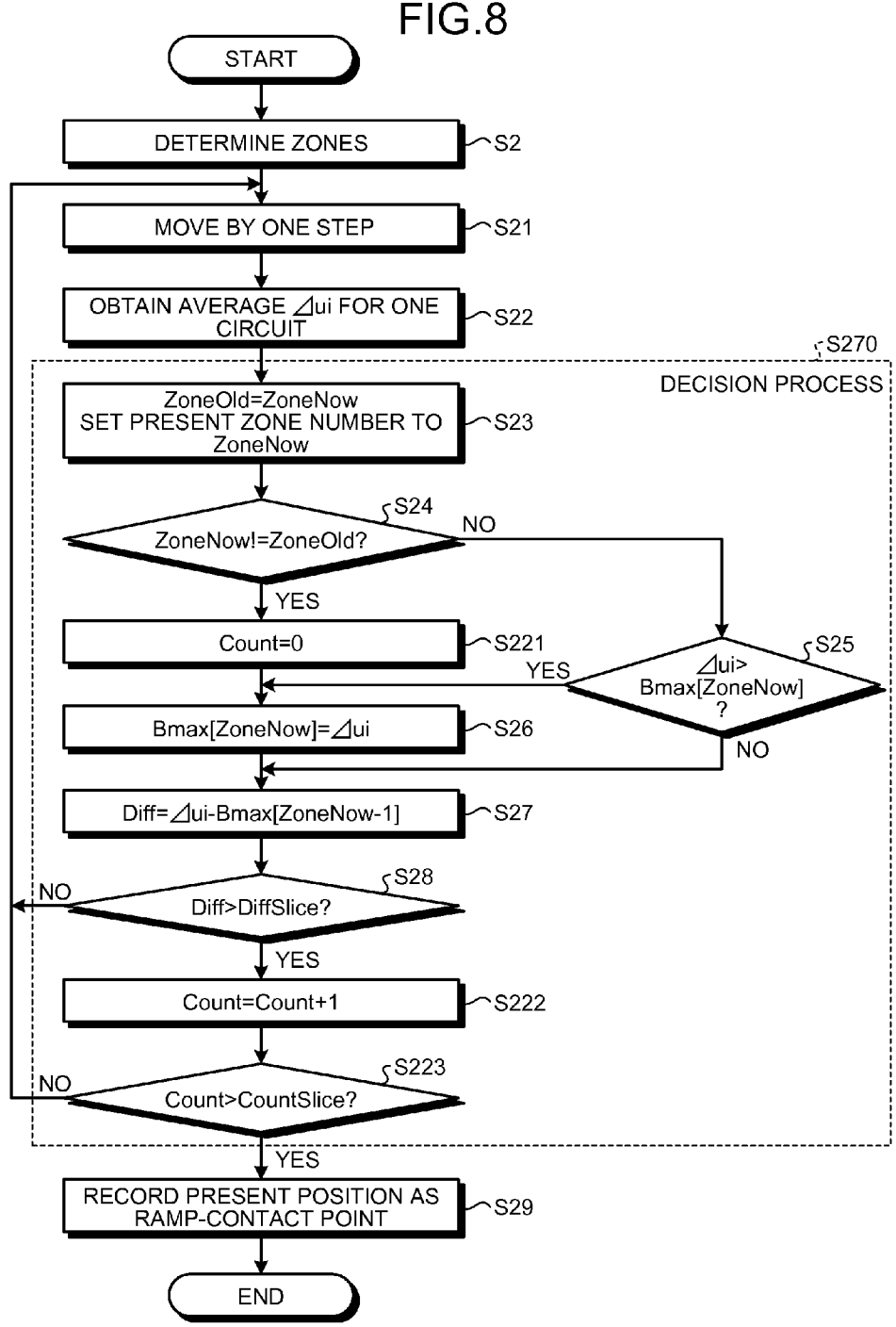
FIG. 8 is a flow chart illustrating a contact-detecting method according to a second embodiment.

Specifically, the contact-detecting method (S20 in FIGS. 2 and 3) differs from the first embodiment as illustrated in FIG. 8. FIG. 8 is a flow chart illustrating the contact-detecting method according to the second embodiment.

If the value of the parameter "ZoneNow" and the value of the parameter "ZoneOld" are different (Yes in S24), the controller 9 decides that the zone including the present measuring point is not the zone including the measuring point measured just before, that is, the measured zone has changed. In response, the controller 9 sets a parameter "Count" for counting the number to an initial value "0" (S221) and advances the process to (S26).

If the difference Diff exceeds the decision-value DiffSlice (Yes in S28), the controller 9 increments the parameter "Count" because the member proximal to the head 4 (tab 43) may have made contact with the ramp member 8 (S222).

The controller 9 decides whether the parameter "Count" exceeds the number threshold CountSlice (S223). If the parameter "Count" does not exceed the number threshold CountSlice (No in S223), the controller 9 decides that the head 4 has not yet made contact with the ramp member 8 and returns the process to S21.

If the parameter "Count" exceeds the number threshold CountSlice (Yes in S223), that is, if the determination condition in the decision process (S270) is satisfied, the controller 9 decides (detects) that the present measuring point is the contact point. The controller 9 then records the present measuring point as the contact point, for example, in the storage circuit 91a6 (S29).

As described above, in the contact-detecting method according to the second embodiment, the present measuring point is detected as the contact point when the number of the difference Diff exceeding the decision-value DiffSlice exceeds the number threshold CountSlice. In this manner, a measurement which obtains a relatively large bias value due to variation in measured values is ignored, and thus the contact with the ramp can further correctly be detected.

It should be noted that the contact-detecting method illustrated in FIG. 8 may be configured that, if the value of the parameter "ZoneNow" and the value of the parameter "ZoneOld" are not identical (Yes in S24), the controller 9 decides whether the difference Diff exceeds the decision-value DiffSlice at the measuring point measured just before (a process similar to S28). In this case, if the difference Diff exceeds the decision-value DiffSlice at the measuring point measured just before, the controller 9 advances the process to S25, and if the difference Diff does not exceed the decision-value DiffSlice at the measuring point measured just before, the controller 9 sets the parameter "Count" for counting the number to the initial value "0" (S221). When the difference Diff exceeds the decision-value DiffSlice but not consecutively in the same zone, the measurement is ignored, and thus the effect of variation in measured values is further suppressed.

Third Embodiment

A contact-detecting method according to a third embodiment will now be described. Description will mainly be made for the configuration different from the first embodiment, and description on the same component as the first embodiment will be omitted or simplified.

In the first embodiment, decision is made whether the difference between the present measured value and the representative value of the zone measured just before exceeds the decision-value (designated slice) DiffSlice. In this decision, detection of gradual change in the value corresponding to the bias force Fb may be required.

In the third embodiment, the difference Diff is integrated and decision is made by comparing the integrated value with an integral decision-value (integral slice). In this manner, even when the change in the value corresponding to the bias force Fb is relatively gradual, the accuracy of detecting contact with the ramp can be improved.

Figure 9:
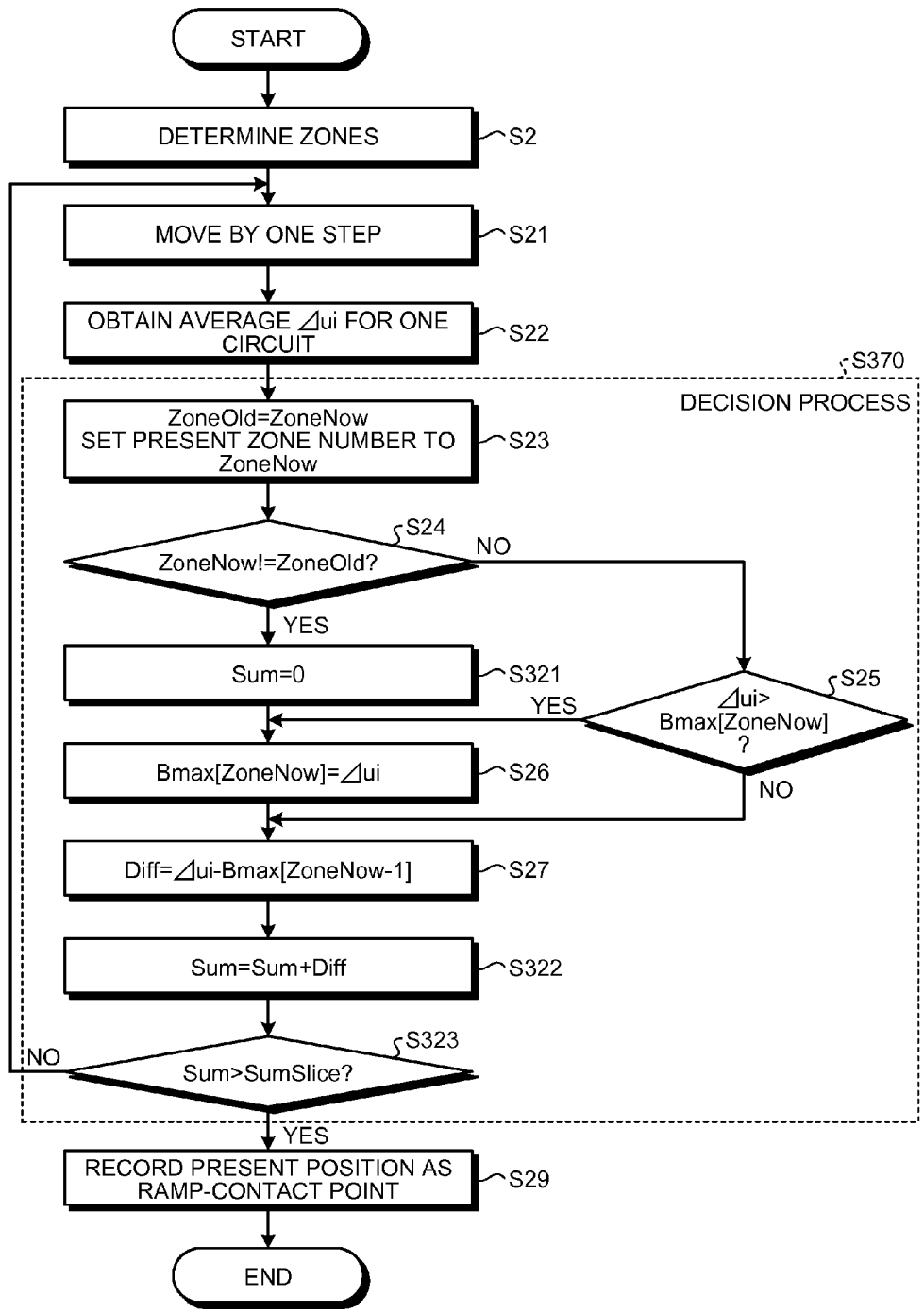
FIG. 9 is a flow chart illustrating a contact-detecting method according to a third embodiment.

Specifically, the contact-detecting method (S20 in FIGS. 2 and 3) differs from the first embodiment as illustrated in FIG. 9. FIG. 9 is a flow chart illustrating the contact-detecting method according to the third embodiment.

If the value of the parameter "ZoneNow" and the value of the parameter "ZoneOld" are not identical (Yes in S24), the controller 9 decides that the zone including the present measuring point is not the zone including the measuring point measured just before, that is, a different zone is being measured. In response, the controller 9 sets a parameter "Sum" for integration to an initial value "0" (S321).

After calculating the difference Diff (S27), the controller 9 adds the difference Diff to the parameter "Sum" and sets the parameter "Sum" to the added result (S322).

The controller 9 decides whether the value of the parameter "Sum" exceeds an integral decision-value SumSlice (S323). If the value of the parameter "Sum" does not exceed the integral decision-value SumSlice (No in S323), the controller 9 decides that the head 4 has not yet made contact with the ramp member 8 and returns the process to S21.

If the value of the parameter "Sum" exceeds the integral decision-value SumSlice (Yes in S323), that is, if the determination condition in the decision process (S370) is satisfied, the controller 9 decides (detects) that the present measuring point is the contact point. The controller 9 then records the present measuring point as the contact point, for example, in the storage circuit 91a6 (S29).

As described above, in the contact-detecting method according to the third embodiment, the present measuring point is detected as the contact point when the integrated value of the difference (parameter "Sum") exceeds the integral decision-value SumSlice. Thus, even when the contact with the ramp member 8 is made but with a relatively gradual change in the value, the change in the gradation of the curve plotted by the value corresponding to the bias force Fb can easily be detected. This improves the accuracy of detecting the contact point.

It should be noted that the contact-detecting method according to the first embodiment and the contact-detecting method according to the third embodiment may be used in combination. In this case, the change in gradation of the curve plotted by the value corresponding to the bias force Fb can be detected easily in the case that the change is steep and gradual. This improves the accuracy of detecting the contact point.

Modified Example

Figure 10:
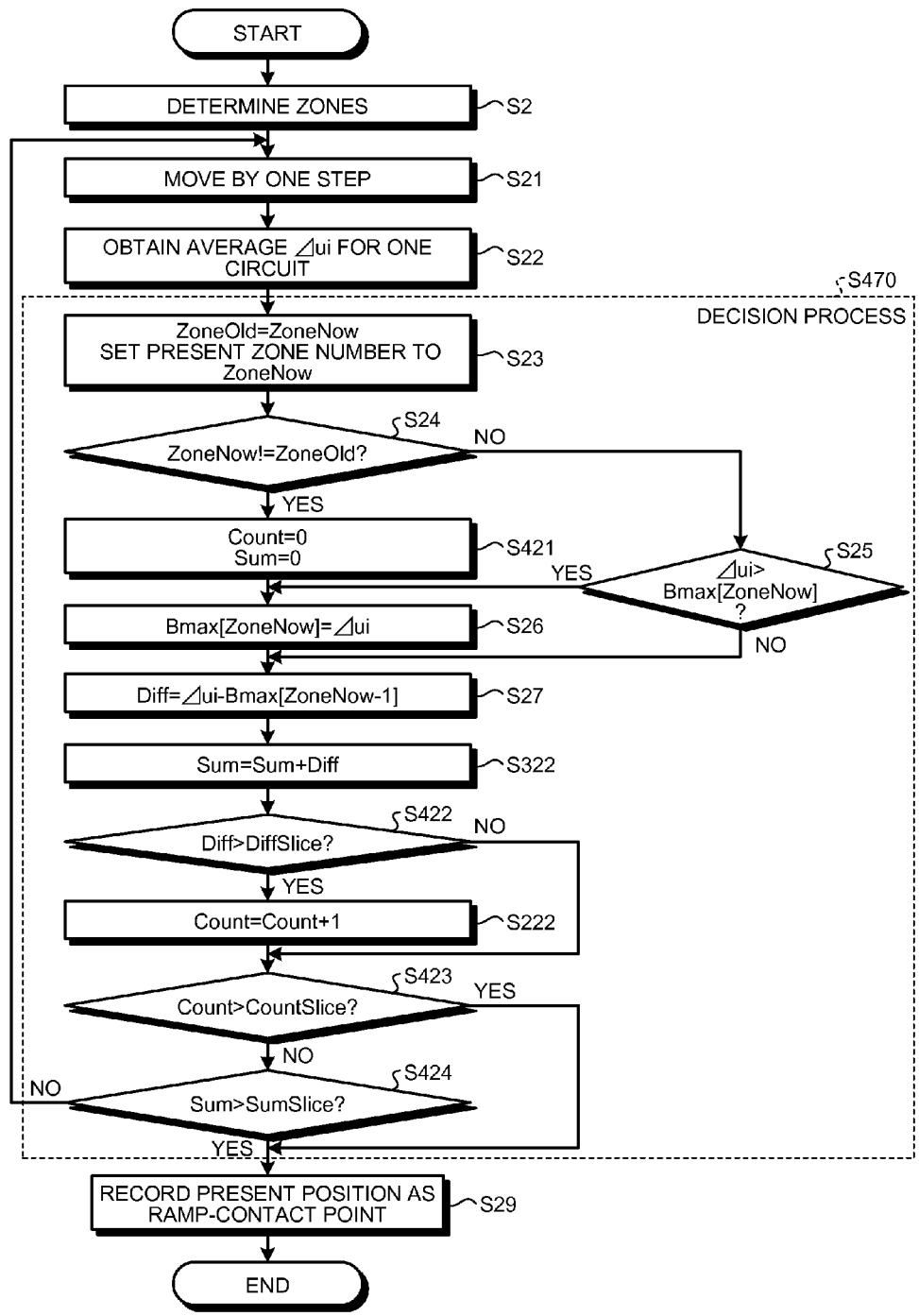
FIG. 10 is a flow chart illustrating a contact-detecting method according to an modified example of the third embodiment.

The contact-detecting method according to the second embodiment and the contact-detecting method according to the third embodiment may be used in combination. Specifically, the contact-detecting method may differ from the first embodiment as illustrated in FIG. 10. FIG. 10 is a flow chart illustrating a contact-detecting method according to a modification of the third embodiment.

If the value of the parameter "ZoneNow" and the value of the parameter "ZoneOld" are not identical (Yes in S24), the controller 9 decides that the zone including the present measuring point is not the zone including the measuring point measured just before, that is, a different zone is being measured. In response, the controller 9 sets the parameter "Count" for counting the number to the initial value "0" and the parameter "Sum" for integrated value to the initial value "0" (S421), and advances the process to (S26).

After calculating the difference Diff (S27), the controller 9 adds the difference Diff to the parameter "Sum" and sets the parameter "Sum" to the added result (S322).

The controller 9 decides whether the difference Diff exceeds the decision-value DiffSlice (S422). If the difference Diff exceeds the decision-value DiffSlice (Yes in S422), the controller 9 increments the parameter "Count" because the head 4 may have made contact with the ramp member 8 (S222). If the difference Diff does not exceed the decision-value DiffSlice (No in S422), the controller 9 decides that the head 4 has not yet made contact with the ramp member 8 and returns the process to S423.

The controller 9 decides whether the parameter "Count" exceeds the number threshold CountSlice (S423). If the parameter "Count" does not exceed the number threshold CountSlice (No in S423), the controller 9 decides that the head 4 has not yet made contact with the ramp member 8 and returns the process to S424.

The controller 9 decides whether the parameter "Sum" exceeds an integral decision-value SumSlice (S424). If the parameter "Sum" does not exceed the integral decision-value SumSlice (No in S424), the controller 9 decides that the head 4 has not yet made contact with the ramp member 8 and returns the process to S21.

If the parameter "Count" exceeds the number threshold CountSlice (Yes in S423), that is, if the determination condition in the decision process (S470) is satisfied, the controller 9 decides (detects) that the present measuring point is the contact point. The controller 9 then records the present measuring point as the contact point, for example, in the storage circuit 91*a*6 (S29).

If the parameter "Sum" exceeds the integral decision-value SumSlice (Yes in S424), that is, if the determination condition in the decision process (S470) is satisfied, the controller 9 decides (detects) that the present measuring point is the contact point. The controller 9 then records the present measuring point as the contact point, for example, in the storage circuit 91*a*6 (S29).

As described above, the contact-detecting method according to the second embodiment and the contact-detecting method according to the third embodiment can be used in combination. Thus, the change in gradation of the curve plotted by the value corresponding to the bias force Fb can be detected easily in the case that the change is steep and gradual. This improves the accuracy of detecting the contact point.

Fourth Embodiment

A contact-detecting method according to a fourth embodiment will now be described. Description will mainly be made for the configuration different from the first embodiment to the third embodiment, and description on the same component as the first embodiment to the third embodiment will be omitted or simplified.

In the first embodiment to the third embodiment, the zone width (the number of measuring points disposed along the radial direction to be included in a zone) needs to be determined appropriately. If the zone width is too small, the method is susceptible to the effect of measurement error and fluctuation of measured values. If the zone width is too large, the long distance from the origin of measurement may cause failure in following the change in the measured value.

In the fourth embodiment, to improve the accuracy of detection, K types of decision (K is an integer of two or higher) are performed in parallel, where zones are divided differently among each decision. For example, if the zone width is of 200 steps (for example, 200 measuring points disposed along the radial direction per zone), the disk drive 1 divides the zone width into four (when K is 4) and performs in parallel four types of decision in four types of zone, respectively, where a zone boundary is shifted by 50 steps from each other between adjacent types of zone. This improves the accuracy of detection.

Figure 11:
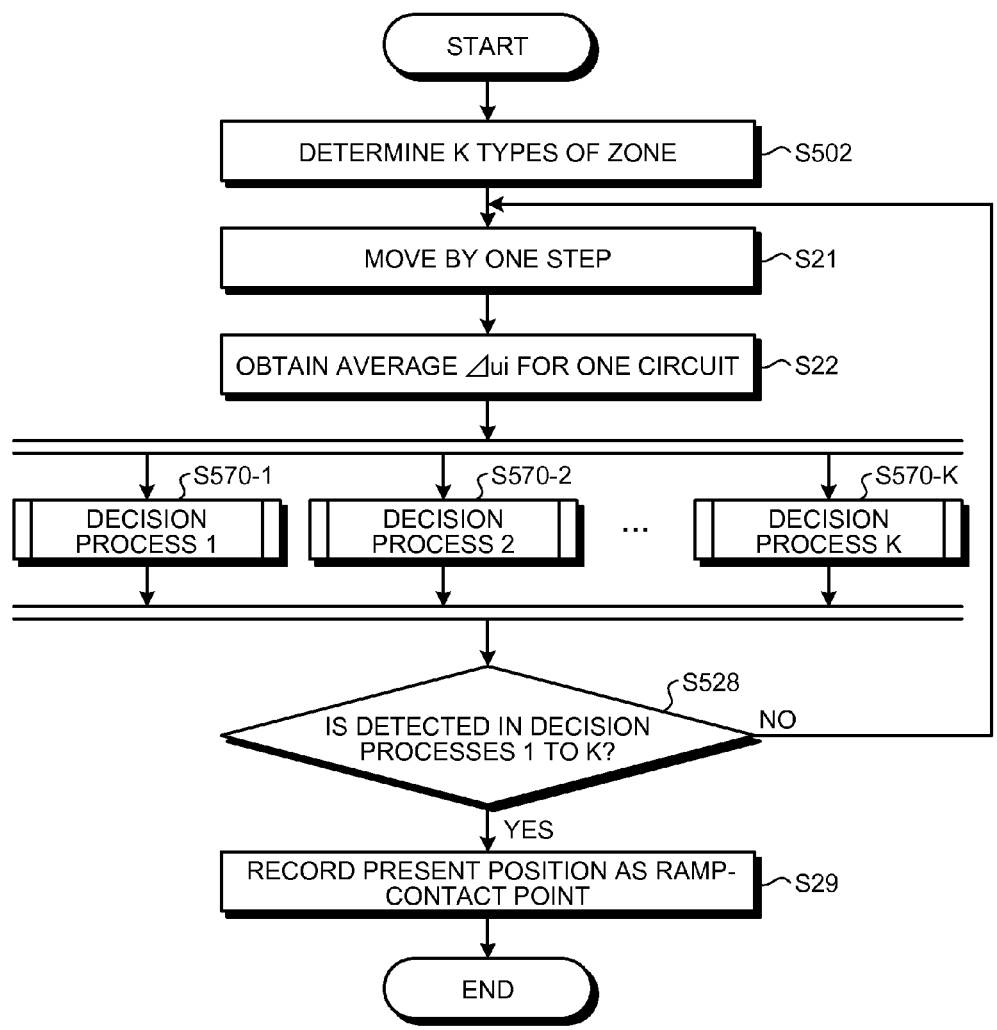
FIG. 11 is a flow chart illustrating a contact-detecting method according to a fourth embodiment.
Figure 12:
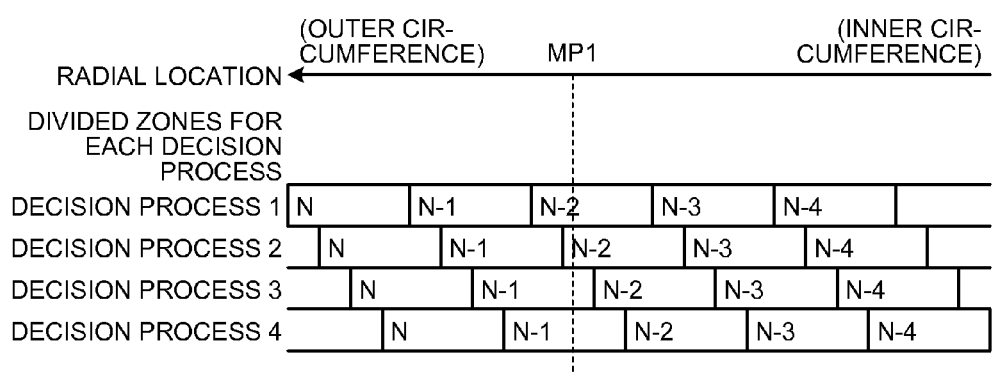
FIG. 12 illustrates zones determined by the contact-detecting method according to the fourth embodiment.

Specifically, the contact-detecting method (S20 in FIGS. 2 and 3) differs from the first embodiment as illustrated in FIGS. 11 and 12. FIG. 11 is a flow chart illustrating the contact-detecting method. FIG. 12 illustrates zones determined by the contact-detecting method.

The controller 9 determines K types of zone on the disk 3 (S502). For example, zones of the second type is provided by shifting the zones of the first type along the radial direction by a shift amount smaller than the zone width (for example, a shift amount of 1/K of the zone width). Repeating this shift, K types of zone can be determined. For each of types of zone, the controller 9 determines a zone number for each zone so that the zone numbers increases toward the moving direction of the head 4 (from the inner circumference to the outer circumference) (see FIG. 12).

For example, when K is 4, boundaries between zones are shifted toward the inner circumference by ¼ of the zone width to determine zones N-4 to N for decision process 1, zones N-4 to N for decision process 2, zones N-4 to N for decision process 3, and zones N-4 to N for decision process 4, as illustrated in FIG. 12.

A plurality of zones N-4 to N for decision processes 1 to 4 is concentrically determined on the disk 3. Each of the zones N-4 to N includes a plurality of measuring points disposed along the radial direction.

For example, the measuring point MP1 provided in the radial location is included in a zone N-2 of the decision process 1, a zone N-2 of the decision process 2, a zone N-1 of the decision process 3, and a zone N-1 of the decision process 4.

The controller 9 averages the values (integral correction values $\Delta u_i$) measured at a plurality of circumferential measuring points on the same radial location for one circuit to determine the measured value of the measuring point (S22). According to the determination made in S502, the controller 9 performs decision process 1 (S570-1) to decision process (S570-K) in parallel. The decision processes S570-1 to S570-K may be one of the decision process S170 according to the first embodiment, the decision process S270 according to the second embodiment, the decision process S370 according to the third embodiment, and the decision process S470 according to the third embodiment, or a combination of two or more of the decision processes.

When the decision process 1 (S570-1) to the decision process K (S570-K) are all finished, the controller 9 decides whether the contact point is detected by any of the decision process 1 (S570-1) to the decision process K (S570-K) (S528).

If none of the decision process 1 (S570-1) to the decision process K (S570-K) detects the contact point (No in S528), the controller 9 decides that the member proximal to the head 4 (tab 43) has not yet made contact with the ramp member 8, and returns the process to S21.

If at least one of the decision process 1 (S570-1) to the decision process K (S570-K) detects the contact point (Yes in S528), the controller 9 records the present measuring point as the contact point, for example, in the storage circuit 91a6 (S29).

As described above, in the contact-detecting method (S20) according to the fourth embodiment, K types of decision process (K is an integer of two or higher) are performed in parallel, where zones are divided differently for different decision processes. In this manner, the distance between the origin of measurement and the present measuring point can substantially be reduced with keeping the zone width, so that the error in detecting the contact point can further be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A contact-detecting method comprising:
    measuring a value corresponding to a force applied to an actuator at a plurality of measuring points disposed along a radial direction as the actuator moves a head along a substantially radial direction across a disk from an inner circumference to an outer circumference;
    calculating a representative value for each of a plurality of first zones, the plurality of first zones being provided at different radial locations on the disk each as a region having a predetermined width along the radial direction, the representative value being calculated based on values measured at a plurality of different radial locations included in each of the first zones; and
    detecting a contact point at which a first member contacts with a second member based on a first difference, the first difference being a difference between a value measured at an objective measuring point and a representative value of a second zone among the plurality of first zones, the objective measuring point being included in a third zone among the plurality of first zones, the second zone being arranged radially inward of the third zone, the first member being attached proximal to the head, and the second member being disposed in a proximity of an outer periphery of the disk.

2. The contact-detecting method according to claim 1 further comprising
    calculating a representative value of a plurality of fourth zones, the plurality of fourth zones being provided by shifting the plurality of first zones along the radial direction by a predetermined amount, the plurality of fourth zones being provided at different radial locations on the disk each as a region having a predetermined width along the radial direction, the representative value of the fourth zone being calculated based on values measured at a plurality of different radial locations included in each fourth zone, wherein
    the detecting a contact point includes detecting the contact point from either one of the first difference and a second difference, the second difference being a difference between a value measured at the objective measuring point and a representative value of a fifth zone among the plurality of fourth zones, the objective measuring point being included in a sixth zone among the plurality of fourth zones, and the fifth zone being arranged radially inward of the sixth zone.

3. The contact-detecting method according to claim 1, wherein
    the detecting a contact point includes deciding whether the first difference satisfies a determination condition, and determining the detected objective measuring point as the contact point when the first difference satisfies the determination condition.

4. The contact-detecting method according to claim 2, wherein
    the detecting a contact point comprises
    performing in parallel a process of deciding whether the first difference satisfies a first determination condition and a process of deciding whether the second difference satisfies a second determination condition, and
    determining the detected objective measuring point as the contact point when the first difference satisfies the first determination condition and/or the second difference satisfies the second determination condition.

5. The contact-detecting method according to claim 3, wherein
    the determination condition comprises at least one of the first difference exceeding a decision-value, a number of the first difference exceeding the decision-value exceeding a number threshold, and an integrated value of the first difference exceeding an integral decision-value.

6. The contact-detecting method according to claim 3, wherein
    the determination condition comprises at least one of a number of the first difference exceeding a decision-value exceeding a number threshold and an integrated value of the first difference exceeding an integral decision-value.

7. The contact-detecting method according to claim 4, wherein,
    the first determination condition comprises at least one of the first difference exceeding a decision-value, a number of the first difference exceeding a decision-value exceeding a number threshold, and an integrated value of the first difference exceeding an integral decision-value, and
    the second determination condition comprises at least one of the second difference exceeding the decision-value, a number of the second difference exceeding the decision-value exceeding the number threshold and an integrated value of the second difference exceeding the integral decision-value.

8. The contact-detecting method according to claim 4 wherein,
the first determination condition comprises at least one of a number of the first difference exceeding a decision-value exceeding a number threshold and an integrated value of the first difference exceeding an integral decision-value, and
the second determination condition comprises at least one of a number of the second difference exceeding the decision-value exceeding the number threshold and an integrated value of the second difference exceeding the integral decision-value.

9. The contact-detecting method according to claim 1, wherein
the measured value corresponding to a force applied to the actuator comprises a value for correcting a positional error of the head from a target position along the radial direction.

10. A manufacturing method of disk drive comprising:
measuring a value corresponding to a force applied to an actuator at a plurality of measuring points disposed along a radial direction as the actuator moves a head along a substantially radial direction across a disk from an inner circumference to an outer circumference;
calculating a representative value for each of a plurality of first zones, the plurality of first zones being provided at different radial locations on the disk each as a region having a predetermined width along the radial direction, the representative value being calculated based on values measured at a plurality of different radial locations included in each of the first zones;
detecting a contact point at which a first member contacts with a second member based on a first difference, the first difference being a difference between a value measured at an objective measuring point and a representative value of a second zone among the plurality of first zones, the objective measuring point being included in a third zone among the plurality of first zones, the second zone being arranged radially inward of the third zone, the first member being attached proximal to the head, and the second member being disposed in a proximity of an outer periphery of the disk; and
performing test of reading and/or writing of data in a region located radially inward of the detected contact point on the disk.

11. The manufacturing method of disk drive according to claim 10 further comprising
calculating a representative value of a plurality of fourth zones, the plurality of fourth zones being provided by shifting the plurality of first zones along the radial direction by a predetermined amount, the plurality of fourth zones being provided at different radial locations on the disk each as a region having a predetermined width along the radial direction, the representative value of the fourth zone being calculated based on values measured at a plurality of different radial locations included in each fourth zone, wherein
the detecting a contact point includes detecting the contact point from either one of the first difference and a second difference, the second difference being a difference between a value measured at the objective measuring point and a representative value of a fifth zone among the plurality of fourth zones, the objective measuring point being included in a sixth zone among the plurality of fourth zones, and the fifth zone being arranged radially inward of the sixth zone.

12. The manufacturing method of disk drive according to claim 10, wherein
the detecting a contact point includes deciding whether the first difference satisfies a determination condition, and determining the detected objective measuring point as the contact point when the first difference satisfies the determination condition.

13. The manufacturing method of disk drive according to claim 11, wherein
the detecting a contact point comprises
performing in parallel a process of deciding whether the first difference satisfies a first determination condition and a process of deciding whether the second difference satisfies a second determination condition, and
determining the detected objective measuring point as the contact point when the first difference satisfies the first determination condition and/or the second difference satisfies the second determination condition.

14. The manufacturing method of disk drive according to claim 12, wherein
the determination condition comprises at least one of the first difference exceeding a decision-value, a number of the first difference exceeding the decision-value exceeding a number threshold, and an integrated value of the first difference exceeding an integral decision-value.

15. The manufacturing method of disk drive according to claim 12, wherein
the determination condition comprises at least one of a number of the first difference exceeding a decision-value exceeding a number threshold and an integrated value of the first difference exceeding an integral decision-value.

16. The manufacturing method of disk drive according to claim 13, wherein
the first determination condition comprises at least one of the first difference exceeding a decision-value, a number of the first difference exceeding the decision-value exceeding a number threshold, and an integrated value of the first difference exceeding an integral decision-value, and
the second determination condition comprises at least one of the second difference exceeding the decision-value, a number of the second difference exceeding the decision-value exceeding the number threshold, and an integrated value of the second difference exceeding the integral decision-value.

17. The manufacturing method of disk drive according to claim 13, wherein
the first determination condition comprises at least one of a number of the first difference exceeding a decision-value exceeding a number threshold and an integrated value of the first difference exceeding an integral decision-value, and
the second determination condition comprises at least one of a number of the second difference exceeding the decision-value exceeding the number threshold, and an integrated value of the second difference exceeding the integral decision-value.

18. The manufacturing method of disk drive according to claim 10 further comprising
writing a servo pattern on the disk after the detection of the contact point.

19. The manufacturing method of disk drive according to claim 10 further comprising calibrating a detected position of the head after the detection of the contact point.

20. A disk drive comprising:
a disk;
a first member attached proximal to a head;
a second member provided in a proximity of an outer periphery of the disk; and
a controller configured to measure a value corresponding to a force applied to an actuator at a plurality of measuring points disposed along a radial direction as the actuator moves the head along a substantially radial direction across the disk from an inner circumference to an outer circumference, to calculate a representative value for each of a plurality of first zones, the plurality of first zones being provided at different radial locations on the disk each as a region having a predetermined width along the radial direction, the representative value being calculated based on values measured at a plurality of different radial locations included in each of the first zones, and to detect a contact point at which the first member contacts with the second member based on a first difference, the first difference being a difference between a value measured at an objective measuring point and a representative value of a second zone among the plurality of first zones, the objective measuring point being included in a third zone among the plurality of first zones, the second zone being arranged radially inward of the third zone.

* * * * *